Patented July 3, 1951

2,558,913

UNITED STATES PATENT OFFICE 2,558,913

LITHIUM MAGNESIUM TUNGSTATE PHOSPHOR

Alexander Pershing Rice, London, England, assignor to Thorn Electrical Industries Limited, London, England, a company of Great Britain No Drawing. Application April 15, 1947, Serial No. 741,700. In Great Britain April 26, 1946

2 Claims. (Cl. 252—301.5)

This invention relates to luminescent materials for use in combination with electric discharge devices adapted to excite them to luminescence.

Various tungstates have been suggested for use as luminescent materials in mercury discharge lamps or in cathode-ray tubes. They include not only single tungstates such as calcium tungstate, but also combinations of tungstates such as zinc cadmium tungstate. It has also been proposed to use activators with the tungstates. Lead has been suggested for the purpose and is reported to give improved efficiencies in certain cases, but the best established examples of such activation are the cases where uranium and bismuth are used in cadmium tungstate, and a new emission band is produced as a result of the addition. In this case the role of the activator is made even more apparent by the fact that the material responds most favorably to 3650 A. U. mercury radiation, whereas without an activator the 2537 A. U. radiation gives the optimum effect.

Among other mixed tungstates reported, A. Schloemer in Journal fuer praktische Chemie, volume 133, (A. 32), pages 51 to 57 inclusive, has mentioned a tungstate phosphor for which he gives the chemical formula, $Li_2O.MgO.2WO_3$, for use with cathode ray excitation, and he reports a bluish-green luminescence. Such a tungstate phosphor may be described as a lithium magnesium tungstate.

An object of my invention is to provide lithium magnesium tungstate phosphors with a red luminescence under 3650 A. U. radiation.

I have discovered that in such lithium magnesium tungstates, if the proportion of magnesium is less than the proportion of lithium and is greater than approximately one-twentieth of the proportion of lithium, the materials can be rendered substantially sensitive to 3635 A. U. mercury radiation, and will show a red fluorescence.

If the material is defined by the formula, $(Li_2O)x$, $(MgO)y$ and $(WO_3)z$, where the letters $x$, $y$ and $z$ represent gram-molecular proportions, the materials according to the inventions are obtained when:

(a) $y$ is less than $x$ and may be reduced to the proportion of $1/20\ x$.

(b) $x+y$ is equal to or greater than $z$ and is in the range $z$ to $2z$.

One method of producing a luminescent material according to the invention will be described by way of example. 46 gm. of lithium carbonate (or the equivalent weight of the oxide $Li_2O$ or of any lithium compound yielding the oxide $Li_2O$ on heating), 16.8 gm. of magnesium carbonate (or the equivalent weight of magnesium oxide or of any magnesium compound yielding MgO on heating) and 116 gm. of tungstic oxide are thoroughly mixed together by milling in a ball mill for several hours. All the constituents must be very pure, and in particular sensibly free from iron, cobalt, nickel and other heavy metal impurities. The mixture is then transferred to a silica tray and heated in air for 30 minutes at 700° C. The temperature is then allowed to rise so as to reach 750° C. at the end of a further 30 minutes. The material is allowed to cool, and gently crushed in a mortar. The product has a red fluorescence when excited by the 3650 A. U. radiation of a mercury discharge lamp, and is therefore particularly suitable for use in combination with mercury-vapour lamps of the high-pressure type, i. e. intended to operate normally at pressures within a range of between 1/3 and 10 atmospheres.

The temperature required to produce the desired effect depends to a large extent on the exact composition of the material. In general it is necessary to heat the material to a temperature just below the fusion temperature in order to obtain satisfactory luminescence. However it has been found that the material may be heated to a temperature well above the fusion temperature, without actually causing fusion, provided that such heating is of short duration only. The exact heating conditions for any particular composition may be easily determined by those skilled in the art.

I claim:

1. A luminescent material sensitive to 3650 A. U. radiation and consisting of a compound of lithium, magnesium, tungsten and oxygen, the composition of the compound being such that, when the compound is defined by the formula $(Li_2O)x$, $(MgO)y$, $(WO_3)z$, where the letters $x$, $y$ and $z$ represent gram-molecular proportions, firstly $y$ is less than $x$ and not less than $x/20$, and secondly the sum of $x$ and $y$ is not less than $z$ and not more than $2z$.

2. A luminescent material sensitive to 3650 A. U. radiations and consisting of a compound of lithium, magnesium, tungsten and oxygen, the composition of the compound being such that, when said compound is defined by the formula $(Li_2O)x$, $(MgO)y$, $(WO_3)z$, where the letters $x$, $y$, and $z$ represent gram-molecular proportions, $x$ is substantially 0.62, $y$ is substantially 0.20, and $z$ is substantially 0.50.

ALEXANDER PERSHING RICE.

REFERENCES CITED

The following references are of record in the file of this patent:

UNITED STATES PATENTS

| Number | Name | Date |
|---|---|---|
| 2,180,734 | George | Nov. 21, 1939 |
| 2,225,704 | McKeag | Dec. 24, 1940 |

OTHER REFERENCES

Journal für Praktische Chemie, vol. 133, 1932, article by A. Schloemer, p. 57.